United States Patent Office 2,865,896
Patented Dec. 23, 1958

2,865,896

HYDROXYACID ESTERS

Frank Fekete, Buffalo, N. Y., assignor to Pittsburgh Plate Glass Company, Allegheny County, Pa., a corporation of Pennsylvania No Drawing. Application January 5, 1956
Serial No. 557,452

11 Claims. (Cl. 260—78.3)

This invention relates to novel esters of hydroxy substituted carboxylic acids and to methods of producing and using the same and it has particular relation to ester products and the method of producing the same in which a salt of hydroxyacetic acid or similar hydroxy acid and a halomethylated aryl compound are reacted to effect ester formation and the liberation of a salt.

It has heretofore been suggested to prepare chloromethyl substituted aryl compounds by reacting aryl compounds, such as xylene or mesitylene, with a lower aldehyde, such as formaldehyde, in the presence of hydrochloric acid with or without zinc chloride. By application of such techniques, it is possible to obtain bis(chloromethyl)xylene and 4,6-bis(chloromethyl)mesitylene and other similar compounds in good yield. A generalized formula of such compounds is

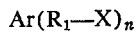

wherein Ar is an alkyl substituted aromatic radical, $R_1$ is alkylene, and X is halogen, such as chlorine or bromine, and $n$ is a whole number from 1 to 3.

It has now been discovered that the foregoing compounds can successfully be reacted with salts of such hydroxy carboxylic acids as hydroxyacetic acid (glycolic acid) and others, to form the esters of methylol substituted benzenes and the hydroxy acids. The resultant compounds fall within the structure:

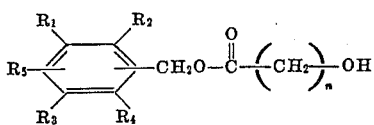

where each of the groups $R_1$, $R_2$, $R_3$, and $R_4$ are hydrogen or methyl and $R_5$ is of the class consisting of hydrogen, chloromethyl, acyloxymethyl (e. g., acetoxymethyl) acryloxymethyl, methacryloxymethyl or the like. The letter $n$ designates a lower number as 1, 2, 3, or 4.

In the practice of the invention various halomethyl derivatives of benzene or naphthalene may be employed as one of the parent compounds from which the hydroxyacid esters of this invention are derived. Examples are: benzyl chloride, 1,4-dimethylbenzyl chloride, 5-chloromethyl-p-xylene, 4,6-bis(chloromethyl)m-xylene, 2,5-bis(chloromethyl)p-xylene, 4,6-bis(chloromethyl)mesitylene and others. Those compounds containing a plurality of chloromethyl groups are presently preferred. These compounds may readily be formed by the halomethylation of o-, m-, or p-xylene with a hydrohalide, such as hydrogen chloride in the presence of an aldehyde, for example, formaldehyde, preferably in the presence of a catalyst, such as zinc chloride. The invention also includes the use of other aldehydes, such as acetaldehyde, propionaldehyde, and butyraldehyde in the haloalkylation.

The pure isomers of xylene may be employed in the reaction with the acid and the aldehyde; however, for reasons of economy, it usually is preferred to employ a commercial mixture of xylenes. These normally comprise about 50 percent of meta, 20 percent of para and 15 percent of ortho isomers. Naturally, substantial variation in these proportions will occur in supplies from different sources. In the structural formulae employed in this application, specific isomers are often indicated. This is merely for purposes of illustration, as similar reactions occur with the other isomers and mixtures.

Particular emphasis is placed upon the use of the xylenes as source materials in the preparation of halomethylated derivatives. It will be appreciated that other alkyl benzenes, such as mesitylene or isomers thereof, may be substituted in the reaction.

The techniques of preparing these halomethyl compounds are illustrated by the following examples:

Example A

The product to be prepared is α,α'-dichlorodurene. The reaction mixture comprised:

|  | Parts by weight |
|---|---|
| m-Xylene | 848 |
| Formaldehyde (37 percent aqueous solution) | 1740 |
| Concentrated aqueous hydrochloric acid | [1] 1800 |
| Zinc chloride | 40 |

[1] (Approximately).

The foregoing mixture was heated at 90° C. to 95° C. for 18 hours while hydrogen chloride gas was bubbled through the mixture. The reaction mixture was cooled and the white solid which crystallized out was filtered, washed with water, dried and crystallized once more from heptane to yield 869 parts by weight of 4,6-bis(chloromethyl)m-xylene melting in a range of 93° C. to 96° C. This was suitable for reaction with salts of hydroxyacetic acid as hereinafter described.

Example B

In order to prepare the corresponding 4,6-bis(chloromethyl)mesitylene, a reaction mixture was prepared comprising:

| Mesitylene | parts by weight | 120 |
|---|---|---|
| Formaldehyde as an aqueous solution | moles | 2.33 |
| Aqueous hydrochloric acid | parts by weight | [1] 450 |
| Zinc chloride | do | 10 |

[1] (Approximately).

This mixture was introduced into a suitable receptacle and was heated to 90° C. and hydrogen chloride was introduced over a period of 6 hours. The reaction mixture was cooled and a solid separated which was filtered off and washed with water. The washed product was crystallized from heptane as white crystals of 4,6-bis(chloromethyl)mesitylene. The yield is 85 parts by weight. This can be reacted with salts of hydroxyacetic acid as herein described.

Example C

For the meta-xylene of Example A, substitute an equal amount of para-xylene and proceed in a similar manner.

A mixture of meta- and para-xylenes may also be chloromethylated, if desired, to provide a mixture of isomeric dichloromethyl xylenes. These may be reacted to form esters of hydroxy acids from methylol substituted benzenes.

The products can be reacted with sodium or potassium salts of hydroxyacetic acid.

Example D

Monochloromethyl derivatives of meta- and para-xylene or mesitylene may be formed in substantial amounts by reducing the proportions of formaldehyde in the foregoing reactions to, or below about 1 mole per mole of the xylene or mesitylene and proceeding as in the foregoing examples.

Various hydroxycarboxylic acids may be employed in the preparation of the esters of the present invention. Such acids include:

Hydroxyacetic acid
Tartaric acid
Lactic acid
Ricinoleic acid
Alpha-hydroxybutyric acid, and others.

These acids preferably are reacted with the chloromethyl derivatives of benzene in the form of the metallic salts, such as the alkali or alkaline earth metal salts, and being represented by sodium, potassium or calcium salts of the acids, such as hydroxyacetic acid.

It is to be recognized that such salts of hydroxyacetic acid as the sodium or potassium salts may be reacted with such chloromethyl derivatives of benzene as bis(chloromethyl)m- or p-xylene, or 4,6-bis(chloromethyl)mesitylene in such proportions as to obtain a preponderant amount of the monoester of such formula as:

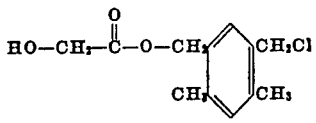

or if preferred, proportions may be regulated in increase of the molecular ratio of the salt of the hydroxyacetic acid to obtain the dihydroxyacetic acid ester of the probable formula:

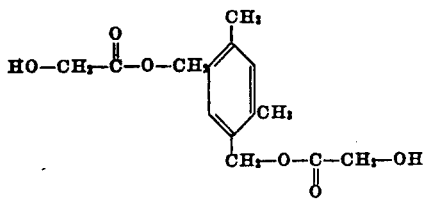

The latter is a glycol and may be reacted with dicarboxylic acids, such as phthalic acids, adipic acid or maleic acid (or anhydrides), to form alkyd resins useful for the purposes of the latter types of resins. Either the mono- or the diesters may be reacted with diisocyanates such as mixed isomers of tolylene diisocyanate to form valuable polyurethane resins useful in the coating arts.

Under the provisions of the present invention, the monoesters of hydroxyacetic acid and 4,6-bis(chloromethyl)m-xylene or 2,5-bis(chloromethyl)p-xylene may be further reacted with salts of other carboxylic acids, such as those containing terminal >C=CH$_2$ groups and being represented by the sodium or potassium salts of acrylic or methacrylic acid, in order to replace the second chlorine group of a dichloromethyl derivative of benzne with a different acid radical such as the acrylic acid or methacrylic acid radical. The resultant products are of the probable formula:

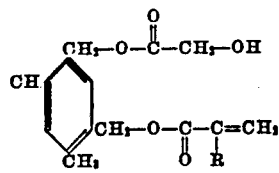

or

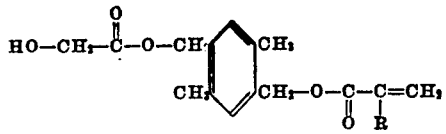

where R is hydrogen or methyl.

These compounds contain both hydroxyl and methylene (>CH$_2$) groups and can undergo a wide variety of the reactions characterizing compounds containing such groups. For example, they can be esterified with numerous compounds containing carbonyl groups to form esters. They can also be reacted with isocyanates such as tolylene diisocyanates in a urethane type reaction. The >C=CH$_2$ group can be homopolymerized by addition, to form high molecular weight polymers. The group will also interpolymerize with other monomers containing the >CH$_2$ group, or with polyesters containing

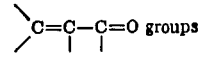 groups

These esters may be termed 6-acryloxymethyl-4-hydroxyacetoxymethyl p-xylene and 2-acryloxymethyl-6-hydroxyacetoxymethyl p-xylene respectively.

The reaction between the salt of the hydroxy acid or the salt of the ethylenically unsaturated acid and the chloromethyl benzene proceeds best in a medium such as dimethyl formamide, dimethyl sulfoxide or in a mixture of the same with a carboxylic acid corresponding to the salt used. The free acid may also be employed as a solvent. The reaction proceeds without catalyst when the mixture is heated, but proceeds faster in the presence of a catalyst such as a quaternary ammonium salt, e. g., trimethylbenzyl ammonium chloride or tetramethyl ammonium chloride or others. The catalyst may be employed in an amount of about 0.01 percent to about 5 percent by weight based upon the mixture. In the reaction of the monochloromethyl ester with a salt of an acid such as methacrylic acid containing a >C=CH$_2$ group, an inhibitor of premature polymerization may also be employed. These include hydroquinone, 4,4'-dihydroxy-3,3'-dimethyl-diphenyl, 3-isopropyl catechol and others, in an amount in a range of about 0.01 percent to 10 percent by weight based upon the mixture. Reaction temperatures may be in a range of about 0° C. to 155° C. and the reaction is substantially complete in about 10 minutes to 6 hours or more.

A convenient technique of reaction is to heat the medium and inhibitor to an appropriate temperature, e. g., to reflux temperature, and then to add the salt of the carboxylic acid in increments as it goes into solution. The chloromethylbenzene derivative is added and the mixture is heated for 10 or 20 minutes or until the precipitation of salt ceases. The mixture is cooled and filtered.

The reaction mixture may then be diluted with toluene and washed with water to remove free acids and other water soluble materials. The product remains in the toluene and is dried over a dehydrating agent such as anhydrous sodium sulfate. The toluene may be evaporated and the crude material may be distilled.

It is to be understood, of course, that if equal molar quantities of the reactants are utilized the predominant product will be the mono-substituted compound, although small quantities of the di-substituted derivative may also be obtained.

The following examples illustrate the preparation of hydroxycarboxylic acid esters of methylol derivatives of benzene under the provisions of the present invention.

*Example I*

In this example, the sodium salt of hydroxyacetic acid is employed as the acid component and 2,6-bis(chloromethyl)p-xylene is employed as the halomethyl substituted benzene component.

A reaction mixture was prepared comprising:

| | Parts by weight |
|---|---|
| Sodium hydroxyacetate | 12.3 |
| 2,6-bis(chloromethyl)p-xylene | 27.8 |

The reactants were dissolved in dimethyl formamide and refluxed for 15 minutes. The esterification reaction under these conditions proceeded with ease. The sodium salt settled out and could be filtered off. The yield of 2- chloromethyl-5-hydroxyacetoxymethyl p-xylene is practically quantitative. The product is of the formula:

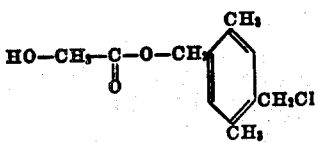

It is to be observed that the compound contains a reactive chlorine atom which can be reacted with other compounds such as the sodium or potassium salt of a carboxylic acid to form esters of the probable formula:

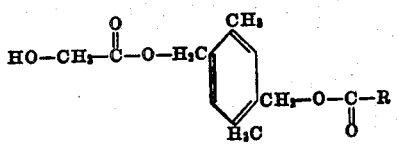

where R is one of the groups:

—CH₂OH,
—CH=CH₂

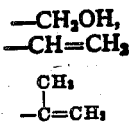

and —H, or the like.

The following example is illustrative of such reaction.

Example II

A reaction mixture was prepared comprising:

| | Parts by weight |
|---|---|
| 2-chloromethyl-5-hydroxyacetoxymethyl p-xylene | 30.31 |
| Potassium methacrylate | 16.0 |
| Inhibitor (hydroquinone) | 3.0 |

The mixture was refluxed in dimethyl formamide and 15 parts by weight of methacrylic acid. Potassium chloride was precipitated and was filtered off. A yield of 91.2 percent of a product consisting mainly of 2-methacryloxymethyl-5-hydroxyacetoxymethyl p-xylene was obtained. The product was poured into a separatory funnel and toluene was added. The mixture was then washed with water to the neutral point. The product in the toluene layer was dried over anhydrous sodium sulfate. The solution of product was poured into an evaporating dish and the toluene was evaporated.

The resultant monomer was catalyzed with a small amount of benzoyl peroxide and was then heated to effect polymerization. The resultant polymer formed hard films suitable for decoration and protection of wood or other surfaces. The product may be cast and cured into hard sheets.

If desired, the potassium salt of methacrylic acid may be replaced by the corresponding salt of acrylic acid to obtain a product containing the acrylate radical instead of the methacrylate. If the methacrylic acid salt is replaced by the sodium or potassium salt of hydroxyacetic acid or glycolic acid, a glycol is obtained which can be reacted with phthalic acid, adipic acid, or other dicarboxylic acids to obtain an alkyd type resin. The glycol product may also be reacted with diisocyanates, such as tolylene diisocyanate or mixed isomers thereof to form polyurethane resins. These may be used for coating wood or metal or the polymerization in the presence of water to form foams.

Example III

Equal parts of the monomer of Example II and dimethylbenzyl methacrylate prepared, as subsequently to be described, were catalyzed with benzoyl peroxide, were spread as films on test panels and were cured by baking for ½ hour at 180° F. The copolymer films were hard, smooth and adherent. The copolymer is useful as a coating material or for casting.

In order to prepare 2-methacryloxymethyl p-xylene, 2-chloromethyl p-xylene is reacted with potassium methacrylate. The proportions are:

| | Parts by weight |
|---|---|
| 2-chloromethyl p-xylene | 154.5 |
| Potassium methacrylate | 135.0 |
| Methacrylic acid | 135.0 |
| Inhibitor (hydroquinone) | 5.0 |
| Catalyst (trimethylbenzylammonium chloride) | 2.0 |

The mixture should be refluxed for ½ hour to 1 hour. The precipitated potassium chloride is filtered off. The filtrate is incorporated with toluene and is washed with water to the neutral point, after which it is dried over anhydrous sodium sulfate and the toluene is evaporated. The resultant dimethylbenzyl methacrylate is suitable for interpolymerizing with 2-methacryloxymethyl-5-hydroxyacetoxymethyl p-xylene or with other unsaturated polymerizable monomers as above described or with other mixed esters of methylol substituted benzene ond mixtures of hydroxy acids and acids containing hydroxyl groups.

Example IV

The 2-methacryloxymethyl-5-hydroxyacetoxymethyl p-xylene was mixed with a like amount of $\alpha,\alpha'$-durenediol dimethacrylate. A catalyst (benzoyl peroxide) was added and the mixture was baked to a hard resinous state. The mixture is valuable for coatings and castings.

The method of preparing $\alpha,\alpha'$-durenediol dimethacrylate is similar to that for preparing dimethylbenzyl methacrylate, and involves reacting $\alpha,\alpha'$-dichlorodurene with the sodium or potassium salt of the acid. An appropriate reaction mixture comprises:

| | Parts by weight |
|---|---|
| $\alpha,\alpha'$-Dichlorodurene | 101.5 |
| Potassium methacrylate | 131.5 |
| Hydroquinone | 15.0 |
| Methacrylic acid | 131.5 |
| Dimethyl formamide | 500.0 |

The mixture is refluxed for two hours. The reaction is fast and potassium chloride settles out. The liquid product layer is removed from the salt. The reaction is practically quantitative. Toluene is added to the product and the solution is then washed with water to neutrality. The washed solution may be dried and distilled to recover the $\alpha,\alpha'$-durenediol methacrylate. The latter is suitable for mixing with 2-methacryloxymethyl-5-hydroxyacetoxymethyl p-xylene as above described to form an interpolymer which is hard and durable in films and in castings.

The mixed esters of methyl substituted benzenes and mixtures of hydroxy substituted carboxylic acids and acrylic or methacrylic acid may be interpolymerized with many other compounds containing terminal $>C=CH_2$ groups attached to a negative radical and being represented by such compounds as:

Styrene
Vinyl toluene
Vinyl polysiloxane
n-Butyl acrylate
n-Butyl methacrylate
Acrylic acid
Vinyl acetate
Triallyl cyanurate
Diallyl phthalate
Allyl methacrylate
Diallyl pentaerythritol
Diallyl itaconate
Bis allyldiglycol carbonate
Glycidyl methacrylate, etc.

These may be mixed with such mixed esters as 2-methacryloxymethyl-5-hydroxyacetoxymethyl p-xylene in amounts of 1 percent to 95 percent by weight based upon the mixture. Interpolymerization may be effected by heating the mixture without catalyst, but it proceeds faster if catalysts such as 0.1 percent to about 5 percent of a peroxide catalyst such as benzoyl peroxide, tertiary butyl peroxide, tertiary butyl hydroperoxide, a diazo catalyst or other free radical initiator is incorporated.

Valuable clear resins having good optical properties useful in glazing vehicles and aircraft are to be obtained.

The esters of hydroxyacids and hydroxymethyl substituted benzenes of this invention are hydroxyacetoxymethyl acryloxymethylaryl compounds having the general formula $$(X\text{—}CH_2)_nAr(CH_2\text{—}Y)$$

wherein Ar is aromatic, of a class consisting of naphthalene and benzene series, X is of the formula

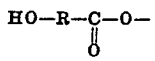

wherein R is alkyl or alkenyl of from 1 to 18 carbon atoms, Y is the same as X, chlorine or acrylic, methacrylic or the like, and $n$ is from 1 to 2.

The embodiments of the invention herein described are by way of illustration. It will be apparent to those familiar with the art that many modifications may be made therein without departing from the spirit of the invention or the scope of the appended claims.

I claim:

1. A compound of the structure $$X\text{—}CH_2\text{—}Ar\text{—}CH_2\text{—}Y$$

wherein Ar is an aromatic radical containing a single benzene nucleus, X is the structure remaining after removal of a hydrogen atom from the carboxyl group of an ethylenically unsaturated aliphatic carboxylic acid selected from the class consisting of acrylic acid and methacrylic acid, and Y is the structure remaining following removal of a hydrogen atom from the carboxyl group of an aliphatic monocarboxylic hydroxyacid.

2. The compound of claim 1 wherein the radical X is the structure remaining after removal of a carboxyl hydrogen atom from a member of the class consisting of acrylic acid and methacrylic acid, and the radical Y is the structure remaining after removal of a hydrogen atom from the carboxyl group of hydroxyacetic acid.

3. A hydroxyacetoxymethylacryloxymethyl xylene.

4. A hydroxyacetoxymethylmethacryloxymethyl xylene.

5. 2 - methacryloxymethyl - 6 - hydroxyacetoxymethyl-p-xylene.

6. 2 - acryloxymethyl - 6 - hydroxyacetoxymethyl - p-xylene.

7. A copolymer of the compound of claim 1 and a polymerizable compound containing a terminal $CH_2\text{=}C\text{<}$ group.

8. A copolymer of the compound of claim 5 and alpha, alpha'-durenediol dimethacrylate.

9. The method of preparing a compound of the structure $$X\text{—}CH_2\text{—}Ar\text{—}CH_2\text{—}Y$$

where Ar is an aromatic radical containing a single benzene nucleus, X is the structure remaining following removal of a hydrogen atom from the carboxyl group of an ethylenically unsaturated aliphatic carboxylic acid selected from the class consisting of acrylic acid and methacrylic acid, and Y is the structure remaining following removal of a hydrogen atom from the carboxyl group of an aliphatic monocarboxylic hydroxyacid, which comprises reacting an aromatic compound containing a single benzene nucleus and having at least two halomethyl substituents attached to the aromatic nucleus with an alkali metal salt of an aliphatic monocarboxylic hydroxyacid, and then reacting the product thus obtained with an alkali metal salt of an ethylenically unsaturated aliphatic carboxylic acid selected from the class consisting of acrylic acid and methacrylic acid, in the presence of a polymerization inhibitor and at a temperature in the range of about 0° C. to 155° C.

10. The method of preparing 2-methacryloxymethyl-6-hydroxyacetoxymethyl-p-xylene which comprises reacting dichloromethyl xylene with hydroxyacetic acid, and then reacting the chloromethylhydroxyacetoxymethyl-p-xylene thus obtained with an alkali metal salt of methacrylic acid in the presence of a polymerization inhibitor, and at a temperature of about 0° C. to 155° C.

11. The method of preparing 2-acryloxymethyl-6-hydroxyacetoxymethyl-p-xylene which comprises reacting dichloromethyl xylene with an alkali metal salt of hydroxyacetic acid, and then reacting the chloromethylhydroxyacetoxymethyl-p-xylene thus obtained with an alkali metal salt of acrylic acid in the presence of a polymerization inhibitor, and at a temperature of about 0° C. to 155° C.

References Cited in the file of this patent

UNITED STATES PATENTS

| | | |
|---|---|---|
| 2,486,831 | Feasley et al. | Nov. 1, 1949 |
| 2,534,255 | Filachione et al. | Dec. 19, 1950 |
| 2,535,875 | Stewart | Dec. 26, 1950 |

FOREIGN PATENTS

| | | |
|---|---|---|
| 552,083 | Great Britain | Mar. 22, 1943 |

UNITED STATES PATENT OFFICE

Certificate of Correction

Patent No. 2,865,896                          December 23, 1958.

Frank Fekete

It is hereby certified that error appears in the above numbered patent requiring correction and that the said Letters Patent should read as corrected below.

Column 3, line 54, for "benzne" read —benzene—; same column, lines 58 to 64, the formula should appear as shown below instead of as in the patent:

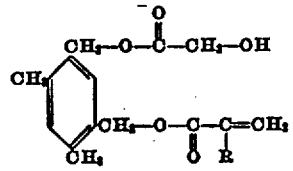

same column 3, lines 66 to 71, the formula should appear as shown below instead of as in the patent:

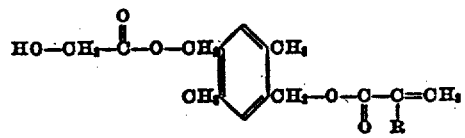

column 6, line 19, for "ond" read —and—.

Signed and sealed this 28th day of July 1959.

[SEAL]

Attest:
KARL H. AXLINE,
*Attesting Officer.*

ROBERT C. WATSON,
                                               *Commissioner of Patents.*